Patented Nov. 30, 1943

2,335,608

UNITED STATES PATENT OFFICE 2,335,608

PRODUCT AND PROCESS

Wilbur Bennett Pings, Wilmington, Del., assignor to E. I. du Pont de Nemours & Company, Wilmington, Del., a corporation of Delaware No Drawing. Application June 12, 1939,
Serial No. 278,755

14 Claims. (Cl. 252—58)

This invention relates to lubricants, and more particularly to the synthetic production of substances which may be used directly as lubricants or which may be added to other lubricants for the purpose of improving the properties of the latter.

The polymerization of olefins to produce lubricating oils is known, and the nature of the oils obtained depends upon the particular olefin used as the starting material as well as the method of polymerization which is employed. Highly unsaturated compounds such as diolefins are generally considered undesirable constituents in the starting material because of their tendency toward resin formation. Lubricating oils hitherto prepared by polymerization have been characterized by many of the same defects as natural petroleum oils, e. g., they are generally deficient in the important qualities of film strength and oiliness characteristics.

This invention has as an object the preparation of new lubricants. A further object is the preparation of new compositions which may be added to lubricating oils to improve their lubricating properties. A further object is the preparation of lubricants of high film strength and good oiliness characteristics. Other objects will appear hereinafter.

These objects are accomplished by the following invention which comprises the polymerization of an olefin hydrocarbon or a mixture of olefin hydrocarbons, preferably a normally liquid hydrocarbon or mixture of hydrocarbons, together with a monoolefin having at least one hydrogen replaced by a polar group, preferably halogen.

The term "polar group" is used herein to describe a group, or atom, which, when substituted for one of the hydrogens in methane, yields a molecule whose electric center does not coincide with the center of gravity. "Polar groups" are further characterized in that, when substituted for one of the hydrogens in methane, they give compounds having dipole moments of at least 0.4 Debye unit. "Polar groups" include, for example, F, Cl, Br, I, —CN, —CHO, —COCH$_3$, —COOH, —COOCH$_3$, —COOC$_2$H$_5$, —OH, —NO$_2$, —NH$_2$, —C$_6$H$_5$, —OC$_6$H$_5$ and —SH. See Smyth, Dielectric constant and molecular structure, pp. 108 and 192–205.

The synthetic lubricating oils described in this invention are prepared by the interpolymerization of an olefin hydrocarbon or a mixture containing a substantial proportion of olefin hydrocarbons with a monoolefin in which one or more atoms of hydrogen have been replaced by a polar group, in the presence of a catalyst of the Friedel-Crafts type.

The more detailed practice of the invention is illustrated by the following examples, wherein parts given are by weight. There are of course many forms of the invention other than these specific embodiments.

EXAMPLE I

A stabilized distillate which is a combination of "gyro" distillates and "poly" distillates, i. e., a mixture of cracked and polymerized distillates having the following characteristics: iodine number 175; A. P. I. gravity 51.6°; A. S. T. M. distillation:

|  | ° C. |
| --- | --- |
| Initial boiling point | 38 |
| 5% | 57 |
| 50% | 130 |
| 90% | 199.7 |
| End point | 212 |

(336 parts; 3 mols calculated as C$_8$H$_{16}$) is mixed with 12 parts of allyl chloride, and aluminum chloride (36 parts; 10% by weight of reactants) added in portions with efficient stirring, keeping the temperature between 30–70° C. by means of external cooling. When about half of the aluminum has been added, a further 11 parts of allyl chloride is put in (total 23 parts; 0.3 mol) followed by the remainder of the aluminum chloride. The reaction mixture is allowed to come to room temperature (about 25° C.) and stirred for 8 hours. The upper oily layer (162 parts) is decanted from the aluminum chloride sludge, washed with dilute (10%) hydrochloric acid, water, 10% sodium hydroxide solution, finally with water, dried over calcium chloride and distilled, yielding the following fractions:

|  | Boiling range | Amount | Percent of starting materials |
| --- | --- | --- | --- |
|  |  | Parts |  |
| 1 | Below 100° at 4 mm | 33.8 | 9.4 |
| 2 | 100–150° at 2 mm | 19.4 | 5.4 |
| 3 | Above 150° at 2 mm | 65.5 | 18.2 |
|  | Light ends and loss | 43.1 | 12.0 |

The properties of fractions 2 and 3 are shown as follows:

|  | Fraction 2 | Fraction 3 |
| --- | --- | --- |
| Sp. g. 25/25° C | .8597 | .9087 |
| Viscosity at 100° F., S. U. V.[1] | 42.2 | 3,203 |
| Viscosity at 210° F., S. U. V. |  | 107.4 |
| Viscosity index [2] |  | —8 |

[1] Saybolt Universal viscosity.
[2] As defined by Dean and Davis, Chem. Met. Eng. 36, 618 (1929).

Fraction 3 had a chlorine content of 0.59%.

EXAMPLE II

The olefin mixture described above (336 parts) is polymerized with chloroallyl chloride, 2,3-dichloropropene-1 (CH$_2$=CCl—CH$_2$Cl) (33.3 parts; 0.3 mol, using 37 parts of aluminum chloride under the conditions described in Example I. That portion of the oil boiling above 150° C. at 2 mm. pressure (77.8 parts; 21% of starting materials) has the following properties:

| | |
|---|---|
| Sp. g. 25/25° C | 0.9219 |
| Viscosity at 100° F., S. U. V | 3429 |
| Viscosity at 210° F., S. U. V | 107.4 |
| Viscosity index | −21 |
| Chlorine per cent | 1.7 |

The stability of these oils under high temperature oxidizing conditions was determined by the following procedure: Twenty-five gram samples of the oils in 50 cc. Erlenmeyer flasks were heated for 25 hours at 170–180° C., moist air being bubbled through the oil at the rate of approximately 2 l./hr. Sludge was determined by diluting 5 g. of oxidizing oil with 45 cc. of precipitation naphtha, cooling, filtering, and weighing the sludge. Results are given as mg. of sludge per 10 g. of oil. The results of the test are summarized in the following tables, which includes comparative data on some other oils prepared by polymerization as well as a peroleum oil. Oil III was prepared by interpolymerizing an equimolar mixture of octene and butadiene by means of an aqueous boron fluoride catalyst. Oil IV represents a high grade paraffin base motor oil of S. A. E. 20 grade.

*Table I*

| Properties of oil before heating | Oil I allyl chloride interpolymer | Oil II chloro-allyl chloride interpolymer | Oil III octene-1-butadiene interpolymer | Oil IV control |
|---|---|---|---|---|
| Viscosity at 100° F., c. s.[1] | 478.1 | 593.7 | 51.11 | 57.88 |
| Viscosity at 210° F., c. s. | 19.27 | 20.96 | 7.18 | 7.83 |

[1] Centistokes.

*Table II*

| Properties of oil after heating | Oil I allyl chloride interpolymer | Oil II chloro-allyl chloride interpolymer | Oil III octene-1-butadiene interpolymer | Oil IV control |
|---|---|---|---|---|
| Viscosity at 100° F., c. s.[1] | 759.7 | 887.8 | 165.3 | 69.69 |
| Per cent increase in viscosity at 100° F | 58.8 | 49.6 | 223 | 20.4 |
| Viscosity at 210° F., c. s. | 24.55 | 25.96 | 12.82 | 8.68 |
| Per cent increase in viscosity at 210° F | 27.4 | 23.8 | 78.5 | 10.9 |
| Sludge mg./10 g. oil | 4.2 | 1.6 | 1.4 | 66.4 |

[1] Centistokes.

The low sludge values of the interpolymerized oils of the present invention under severe conditions are noteworthy in comparison with the high grade control oil, and the oils of the present invention are markedly superior to an oil prepared from a diolefin in regard to viscosity increase, and only slightly inferior to the control oil in that respect. The remarkable film strength of the interpolymerized oils is shown in Table III below.

The allyl chloride and chloroallyl chloride interpolymers shown in the above table were prepared in accordance with Examples I and II above, and contain 0.77% and 2.01% of chlorine respectively.

The load-carrying capacity (film strength) of the interpolymerized oils was evaluated in the Cornell (Faville-Levally) friction testing device, a machine which has been designed especially for determining the usefulness of lubricating compounds at high bearing pressures. This machine consists of a steel pin held in position by a soft brass pin and mounted to rotate at a speed of about 325 R. P. M. between the flat surfaces of two steel blocks. The blocks can be moved toward each other by means of jaws, and the actual amount of force used to press the blocks against the pin is indicated upon a gauge reading from 0 to 4500 pounds. The gauge reading is not in pounds per square inch since the actual area of the blocks in contact with the pin is much less than one square inch. The device also has means to indicate the torque, which is a measure of the resistance to rotation of the pin between the blocks and is given in pound inches. The blocks and the pin are immersed in a small container in which the oil to be tested can be placed. The testing machine is provided with means to tighten up the jaws, and hence press the blocks against the pin in a continuous manner as the test progresses. Failure of the lubricating film is indicated by seizure and consequent shearing of the brass pin, or by a "squealing" with a sharp and persistent rise in torque although the bearing continues to turn without actual seizure. Using this test procedure, the interpolymerized oils obtained from allyl chloride and from chloroallyl chloride, containing 0.77% and 2.01% of chlorine respectively, withstood the loads shown in the following table:

*Table III*

| Oil | Maximum load | Torque at maximum load |
|---|---|---|
| Allyl chloride interpolymer | 4,500 | 52 |
| Chlorallyl chloride interpolymer | 4,250 | 50 |
| Oil A (control) | 750 | 16 |
| Oil A containing 5% of a mixture of tetrachloroamylbenzene and pentachloroamylbenzene, the chlorine being on the nucleus (total Cl=ca. 2.6%) | 1,500 | 30 |

(Oil A is a commercial oil of Mid-Continent origin, S. A. E. 30 grade).

EXAMPLE III

A mixture of olefins boiling at 90–100° C. (fraction polymer gasoline; iodine number 295) is interpolymerized with phenyl allyl ether in the proportion of 15:1 by weight (about 20:1 on molar basis), using about 19% by weight of aluminum chloride. The reaction is kept below 10° C. for 4 hours, then allowed to warm up slowly and stirred for 4 hours at about 30° C. The reaction mixture is treated as described in the preceding examples. A light yellow oil boiling above 150° C. at 2 mm. pressure is obtained in 18% yield (based on starting materials), which has the following properties:

| | |
|---|---|
| Sp. gr. 25/25° C | 0.8619 |
| Viscosity at 100° F., S. U. V | 2,549 |
| Viscosity at 210° F., S. U. V | 86.1 |
| Viscosity index | −62 |
| Coefficient of station friction | 0.21 |
| (Control S. A. E. 20W oil) | 0.17 |
| Per cent oxygen (by difference) | 1.28 |

The coefficient of static friction was determined by measuring the force required to start a steel rider, operating on 3 fixed ball bearings, moving over a smooth steel plate to which the oil had been applied. As the friction may vary with the degree of polish of the steel plate, a control is included for each measurement.

EXAMPLE IV

The olefin mixture described in Example III is interpolymerized with N-allylaniline using the proportions and conditions of Example III. The oil boiling above 150° C. at 2 mm. pressure is obtained in 15% yield and has the following properties:

| | |
|---|---|
| Sp. gr. 25/25° C | 0.8488 |
| Viscosity at 100° F., S. U. V | 601.4 |
| Viscosity at 210° F., S. U. V | 53.6 |
| Viscosity index | —25 |
| Coefficient of static friction | 0.19 |
| (Control S. A. E. 20W oil) | 0.16 |
| Per cent nitrogen | 0.52 |

From this reaction there is also obtained 20% of a light oil (boiling range 100–150° C. at 2 mm. pressure), which has the following properties:

| | |
|---|---|
| Sp. Gr. 25/25° C | 0.8269 |
| Viscosity at 100° F., S. U. V | 58.7 |
| Viscosity at 210° F., S. U. V | 34.2 |
| Viscosity index | 100 |
| Coefficient of static friction | 0.19 |
| (Control S. A. E. 20W oil) | 0.15 |

EXAMPLE V

The olefin mixture described in Example III is interpolymerized with N,N-diallylaniline in the proportion of 11.5:1 by weight (20:1 on molar basis) using the conditions outlined above. The oil boiling above 150° C. at 2 mm. pressure amounts to 7% of the starting materials, and has a nitrogen content of 0.70%.

EXAMPLE VI

An olefin mixture (polymer gasoline) having a boiling range of 31 to 196° C. and an iodine number of 250 (196 parts; 2 moles calculated as $C_7H_{14}$) is mixed with styrene (52 parts; 0.5 mole), and aluminum chloride (24.8 parts; 10% by weight) added in portions with efficient stirring over a period of 1½ hours. The temperature of the reaction mixture is held between 10–12° C. during the addition of the catalyst. The solution is allowed to warm up slowly, stirred for 4 hours at about 30° C., and then for 8 hours at about 50° C. The upper oily layer (149 parts) is decanted from the aluminum chloride sludge, washed with water and dilute (10%) ammonium hydroxide, dried over anhydrous sodium sulfate and distilled. That portion of the product boiling above 150° C. at 3 mm. pressure (62.5 parts; 25% of starting materials) is a viscous oil having the following properties:

| | |
|---|---|
| Sp. gr. 25/25° C | 0.9262 |
| Viscosity at 100° F., S. U. V | 13,400 |
| Viscosity at 210° F., S. U. V | 147.3 |
| Coefficient of static friction | 0.25 |
| (Control—naphthenic base oil of S. A. E. 20W grade) | 0.23 |

The behavior of this oil when subjected to the stability test outlined above is shown in the following table:

| | Properties of oil | |
|---|---|---|
| | Before heating | After heating |
| Viscosity at 100° F., c. s | 2,775 | |
| Viscosity at 210° F., c. s | 31.43 | 38.28 |
| Percent increase in viscosity at 210° F | | 21.8 |
| Acidity mg. KOH/g. oil | 0.08 | |
| Sludge mg./10 g. oil | | 3.9 |

That portion of the product which distills between 100 and 150° C. at 3 mm. pressure (22.8 parts; 9%) is a light oil having the following properties:

| | |
|---|---|
| Sp. gr. 25/25° C | 0.8384 |
| Viscosity at 100° F., S. U. V | 47.6 |
| Viscosity at 210° F., S. U. V | 32.7 |
| Coefficient of static friction | 0.24 |
| (Control—naphthenic base oil of S. A. E. 20W grade) | 0.20 |

EXAMPLE VII

An olefin mixture having a boiling range of 100–120° C. (fraction of polymer gasoline) is interpolymerized with styrene in the ratio of about 9.4:1 by weight, using 10% by weight of aluminum chloride under the conditions described in Example VI. The properties of the oils obtained are shown as follows:

| | Product boiling 100–150° C. at 2 mm. | Product boiling above 150° C./2 mm. |
|---|---|---|
| Sp. gr. 25/25° C | 0.8398 | 0.9856 |
| Viscosity at 100° F., S. U. V | 63.3 | 3,672 |
| Viscosity at 210° F., S. U. V | 34.6 | 88.5 |
| Viscosity index | 84 | —151 |
| Percentage yield | 16 | 25 |
| Coefficient of static friction | 0.23 | 0.20 |
| (Control—naphthenic base oil of S. A. E. 20W grade) | 0.20 | 0.22 |

EXAMPLE VIII

Styrene is interpolymerized with an olefin mixture (fraction of polymer gasoline, boiling range 120–150° C.) using the proportions and conditions given in Example VII. The oils obtained have the following properties:

| | Product boiling 100–150° C. at 2 mm. | Product boiling above 150° C./2 mm. |
|---|---|---|
| Percentage yield | 14.2 | 22.7 |
| Sp. gr. at 25/25° C | 0.8312 | 0.8904 |
| Viscosity at 100° F., S. U. V | 52.5 | 2,398 |
| Viscosity at 210° F., S. U. V | 33.3 | 80.4 |
| Viscosity index | | —88 |
| Coefficient of static friction | 0.22 | 0.17 |
| (Control—naphthenic base oil of S. A. E. 20W grade) | 0.22 | 0.22 |

EXAMPLE IX

An olefin mixture (fraction of polymer gasoline, boiling range 90–100° C.) is interpolymerized with styrene using the proportions and conditions given in Example VII. The oils obtained have the following properties:

| | Product boiling 100–150° C. at 2 mm. | Product boiling above 150° C./2 mm. |
|---|---|---|
| Percentage yield | 17.2 | 29.1 |
| Sp. gr. at 25/25° C | 0.8349 | 0.8876 |
| Viscosity at 100° F., S. U. V | 57.6 | 3,490 |
| Viscosity at 210° F., S. U. V | 33.9 | 85.3 |
| Viscosity index | | —163 |
| Coefficient of static friction | 0.20 | 0.16 |
| (Control—naphthenic base oil of S. A. E. 20W grade) | 0.22 | 0.22 |

EXAMPLE X

A mixture of olefins (fraction of polymer gasoline, boiling range 150–170° C.; 50 parts) is cooled to —5° C. and saturated with dry gaseous boron fluoride. After 1½ hours, styrene (2.65 parts) is added slowly with stirring, the solution again saturated with dry gaseous boron fluoride, and stirring continued for three hours at −5° C. The solution is finally stirred for 4 hours at about 30° C., then allowed to stand for 64 hours. The oil is decanted from the boron fluoride sludge, washed and dried as described in the previous examples, and distilled. The fraction boiling 100–150° C. at 2 mm. pressure (17.6%) has the following properties:

Sp. gr. 25/25° C. _____ 0.8164
Viscosity at 100° F., c. s. _____ 5.26
Viscosity at 210° F., c. s. _____ 1.68
Coefficient of static friction _____ 0.21
(Control—naphthenic base oil of S. A. E. 20W grade) _____ 0.16

Only 6.1% of material boiling above 150° C. at 2 mm. pressure was obtained.

All of the viscosity measurements were made in modified Ostwald viscosimeters as described by McCluer and Fenske (Ind. Eng. Chem. 27, 82–6 (1935); (Proc. A. S. T. M. 38, part I, 900–908 (1938)) giving the kinematic viscosity in centistokes. Conversion to Saybolt units was made according to McCluer and Fenske, and Report of Committee D-2 on Petroleum Products and Lubricants, Pamph., preprint, A. S. T. M. meeting June 28–July 2, 1937. The viscosity index as defined by Dean and Davis in Chem. & Met. Eng. 36, 618 (1929) was calculated from the tables in Hersh, Fisher and Fenske, Ind. Eng. Chem. 27, 1441–6 (1935).

The present invention is generic to the production of lubricants or lubricant components by the polymerization of olefin hydrocarbons or mixtures of olefin hydrocarbons, preferably normally liquid, with a compound having one and only one olefin group and having at least one polar substituent. The preferred polar substituents are halogens, and of these, chlorine is most desirable, particularly because of cost. Other polar substituents are —NH$_2$, substituted amino groups, —NO$_2$, —OH, —COOH and esters thereof, —SH, —SO$_2$H, —SO$_3$H, —PO$_3$H, aryl radicals, such as C$_6$H$_5$, aryl ether groups such as —OC$_6$H$_5$, etc. Among the olefins that are suitable for this invention are propylene, butylene, isobutylene, ethylene, cracked refinery gases, pentene-1 and pentene-2, for the gaseous olefins; the much preferred liquid olefins include, among others, polymer gasoline, cracked gasoline, hexene-2, di-, tri- and tetra-isobutylene, and the extract portion of solvent extracted gasoline.

The polar substituted ethylenic components of the interpolymers of this invention include, among others: allyl alcohol, allylamine, cinnamyl alcohol, oleyl alcohol, oleylamine, oleic acid, 2-ethylhexene-2-al-1, 2-ethylhexene-2-ol-1, crotyl alcohol, crotyl chloride, 1-chloro-3-hydroxy-propene-1, crotylamine, 1-chloro-2-methyl-propene-1, mesityl oxide, methacrolein, methallyl alcohol, methallyl amine, methallyl chloride, methyl isopropenyl ketone, methyl vinyl chloride, tiglic acid, tiglic aldehyde, tiglic alcohol, tiglic chloride, butylidene acetone, di-, tri- and tetrachloroethylene, etc.

For catalyzing the polymerization, any of the substances may be used which are known to exert a condensing or polymerizing action on unsaturated compounds, e. g., Florida earth, hydrofluoric acid, and benzoyl peroxide, although the Friedel-Crafts type of catalyst, e. g., aluminum chloride, boron trifluoride, ferric chloride, zinc chloride, is preferred. The proportions of the reactants, the amount of catalyst, and the conditions of the polymerization may be varied within wide limits, depending upon the starting materials and the type of product desired, and are best determined by experiment. Since it is not intended nor desired to produce resins by this process, it is necessary to choose conditions which will lead to liquid products rather than to gels or resins.

The olefin hydrocarbon is preferably used in considerable excess. Thus the molar ratio of olefin hydrocarbon to polar substituted hydrocarbon may be 20:1 (Examples 1, 3, 4, 5); 10:1 (Example 2); 4:1 (Example 6), but ratios as high as 100:1 and as low as 1:1 may be employed. The higher ratios tend to give products approaching polymerized olefins in character therefore of decreased oiliness, while the lower ratios tend to give products well adapted for certain uses, for example, textile assistants on account of their tendency to emulsify.

The amount of catalyst may be varied. Ten per cent by weight of catalyst, based on the total weight of the other components of the reaction mixture gives desirable results, but amounts as high as 20% and as low as 1–2% may be employed. Large amounts of catalyst are not desirable in that the added cost of catalyst is not compensated for by the results obtained.

The polymerization may be effected at temperatures between 10° and 70°. The reaction is preferably kept at or below room temperature until the first stage of the reaction is completed. Higher temperatures in general tend to give lower molecular weight products, and the optimum temperatures can best be determined by a preliminary experiment, since it also depends upon the starting olefin and the polar substituted olefin, as well as the kind and amount of catalyst. Pressure conditions may at times be desirable particularly in the case of gaseous reactants.

Distillation is used to remove the light ends (i. e., low molecular weight and unpolymerized material), much as is done in the usual operation on crude oil. The viscosity of the product is thus dependent upon the degree of topping, i. e., as higher and higher fractions are removed, the residue becomes more and more viscous. Products of selected viscosities are therefore obtained by suitable cutting of the distillate into fractions, and, if desirable or necessary, combining all or part of the various fractions to obtain the desired viscosity.

The products as prepared according to the present invention should be substantially fluid at room temperature, and should preferably have viscosities not exceeding 200 seconds S. U. V. at 210° F.

The oils described herein may be employed in a wide variety of lubricant uses as determined by their specific properties. As an example, the oils prepared by interpolymerization of the halogenated mono-olefins, because of their high film strength and extreme pressure characteristics, are useful for difficult metal-working and cutting operations, and other applications in which conditions of high pressure are encountered, such as airplane crankcase oils. Interpolymerization of olefins substituted with an acid or ester group yields oils of enhanced lubricity, which are of value in the automobile crankcase field and in many metal-forming and cutting operations where an extreme-pressure type of lubricant is not required. Lubricating oils containing a carboxyl group, or those prepared, for example from an olefin containing a hydroxyl or sulfonic acid group are of use as textile lubricants, where ready emulsification is desirable. The lower boiling fractions obtained in the polymerizations find use as light oils for textile machinery, general household purposes, musical instruments, clocks, watches, and the like. The products obtained which are too viscous to be used as lubricants per se may advantageously be employed for blending with other oils whose properties it is desired to improve.

The present invention is highly advantageous in that it permits the controlled production of lubricating oils having certain desirable properties built into the molecule. By this is meant that it is possible to select an olefin having the polar group which it is desired to have present in the finished lubricant. For example, a chlorine group to impart film strength; a carboxyl group, oiliness; a sulfonic group, ready emulsification; etc.

As shown in the examples, an allyl chlorine interpolymer containing only 0.77% chlorine withstood the full load of 4500 pounds on the Cornell machine. An oil with over three times this chlorine content, obtained by the addition of a chlorine-containing compound to a petroleum lubricating oil, failed at the relatively low load of 1500 pounds.

A further advantage is the relative stability of the interpolymerized oils under high temperature oxidizing conditions. It should be noted particularly that the viscosity increase of the oils of the present invention is about one-fourth at 100° F. and one-third at 210° F. of that obtained in the case of an octene-butadiene interpolymer. This tendency of diolefin interpolymers to undergo further polymerization upon heating is one which renders their use in oils inadvisable. Furthermore, comparatively mild conditions must be employed in polymerizations involving diolefins, since the use of reagents such as aluminum chloride leads to the formation of tars and resins. These disadvantages also obtain in the case of halogenated alkapolyenes. The low sludge values of the interpolymerized oils in comparison with a petroleum oil are indicative of the stability characteristics of the oils in the present invention.

The above description and examples are intended to be illustrative only. Any modification of or variation therefrom which conforms to the spirit of the invention is intended to be included within the scope of the claims.

I claim:

1. A lubricating composition substantially fluid at room temperature, having a viscosity not exceeding 200 seconds S. U. V. at 210° F., and consisting essentially of an interpolymer of a monoolefinic hydrocarbon and a monoolefin having at least one polar inorganic substituent, said lubricating composition containing polar substituent from the polar substituted monoolefin.

2. A lubricating composition substantially fluid at room temperature, having a viscosity not exceeding 200 seconds S. U. V. at 210° F., and consisting essentially of an interpolymer of a monoolefinic hydrocarbon and a monohalogenated monoolefin, said lubricating composition containing halogen from the monohalogenated monoolefin.

3. A lubricating composition substantially fluid at room temperature, having a viscosity not exceeding 200 seconds S. U. V. at 210° F., and consisting essentially of an interpolymer of a monoolefinic hydrocarbon and a monochloro monoolefin, said lubricating composition containing chlorine from the monochloro monoolefin.

4. A lubricating composition substantially fluid at room temperature, having a viscosity not exceeding 200 seconds S. U. V. at 210° F., and consisting essentially of an interpolymer of a mixture of normally liquid monoolefinic hydrocarbons and a monoolefin having at least one polar inorganic substituent, said lubricating composition containing polar substituent from the polar substituted monoolefin.

5. A lubricating composition substantially fluid at room temperature, having a viscosity not exceeding 200 seconds S. U. V. at 210° F., and consisting essentially of an interpolymer of a mixture of normally liquid monoolefinic hydrocarbons and a monohalogenated monoolefin, said lubricating composition containing halogen from the monohalogenated monoolefin.

6. A lubricating composition substantially fluid at room temperature, having a viscosity not exceeding 200 seconds S. U. V. at 210° F., and consisting essentially of an interpolymer of a mixture of normally liquid monoolefinic hydrocarbons and a monochloro monoolefin, said lubricating composition containing chlorine from the monochloro monoolefin.

7. A lubricating composition substantially fluid at room temperature, having a viscosity not exceeding 200 seconds S. U. V. at 210° F., and consisting essentially of an interpolymer of a monoolefinic hydrocarbon and a halogen substituted monoolefin, said lubricating composition containing halogen from the halogen substituted monoolefin.

8. A lubricating composition substantially fluid at room temperature, having a viscosity not exceeding 200 seconds S. U. V. at 210° F., and consisting essentially of an interpolymer of a monoolefinic hydrocarbon and a chlorine substituted monoolefin, said lubricating composition containing chlorine from the chlorine substituted monoolefin.

9. A lubricating composition substantially fluid at room temperature, having a viscosity not exceeding 200 seconds S. U. V. at 210° F., and consisting essentially of an interpolymer of a mixture of monoolefinic hydrocarbons and a halogen substituted monoolefin, said lubricating composition containing halogen from the halogen substituted monoolefin.

10. A lubricating composition substantially fluid at room temperature, having a viscosity not exceeding 200 seconds S. U. V. at 210° F., and consisting essentially of an interpolymer of a mixture of monoolefinic hydrocarbons and a chlorine substituted monoolefin, said lubricating composition containing chlorine from the chlorine substituted monoolefin.

11. A lubricating composition substantially fluid at room temperature, having a viscosity not exceeding 200 seconds S. U. V. at 210° F., and consisting essentially of an interpolymer of a monoolefinic hydrocarbon and allyl chloride, said lubricating composition containing chlorine from the allyl chloride.

12. A lubricating composition substantially fluid at room temperature, having a viscosity not exceeding 200 seconds S. U. V. at 210° F., and consisting essentially of an interpolymer of a monoolefinic hydrocarbon and chlorallyl chloride, said lubricating composition containing chlorine from the chlorallyl chloride.

13. A lubricating composition substantially fluid at room temperature, having a viscosity not exceeding 200 seconds S. U. V. at 210° F., and consisting essentially of an interpolymer of a mixture of monoolefinic hydrocarbons and allyl chloride, said lubricating composition containing chlorine from the allyl chloride.

14. A lubricating composition substantially fluid at room temperature, having a viscosity not exceeding 200 seconds S. U. V. at 210° F., and consisting essentially of an interpolymer of a mixture of monoolefinic hydrocarbons and chlorallyl chloride, said lubricating composition containing chlorine from the chlorallyl chloride.

WILBUR BENNETT PINGS.

CERTIFICATE OF CORRECTION.

Patent No. 2,335,608. November 30, 1943.

WILBUR BENNETT PINGS.

It is hereby certified that error appears in the printed specification of the above numbered patent requiring correction as follows: Page 1, second column, line 24, before "has" insert --chloride--; page 2, first column, line 2, after "mol" and before the comma insert a closing parenthesis; line 26, for "peroleum" read --petroleum--; and second column, line 38, Table III, for "chlorallyl" read --chloroallyl--; line 65, for "station" read --static--; page 3, first column, line 43, for "10-12°" read --10-20°--; page 5, first column, line 22, for "chlorine" read --chloride--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.